(12) United States Patent
Schaeffer

(10) Patent No.: US 12,332,396 B2
(45) Date of Patent: Jun. 17, 2025

(54) MACHINE LEARNING GUIDED SUBSURFACE FORMATION MICROSEISMIC IMAGING

(71) Applicant: Halliburton Energy Services, Inc., Houston, TX (US)

(72) Inventor: Benjamin Simon Schaeffer, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 312 days.

(21) Appl. No.: 17/871,545

(22) Filed: Jul. 22, 2022

(65) Prior Publication Data

US 2024/0027640 A1 Jan. 25, 2024

(51) Int. Cl.
*G01V 1/22* (2006.01)
*G01V 1/28* (2006.01)
(Continued)

(52) U.S. Cl.
CPC .............. *G01V 1/226* (2013.01); *G01V 1/288* (2013.01); *G01V 1/42* (2013.01); *G01V 1/50* (2013.01);
(Continued)

(58) Field of Classification Search
CPC .......... G01V 1/226; G01V 1/288; G01V 1/42; G01V 1/50; G01V 2210/1234; G01V 2210/1299; G01V 2210/41; G01V 2210/646; G06N 3/084; G06N 20/00; G06T 2207/20081; G06T 7/00; G06T 5/60
See application file for complete search history.

(56) References Cited

U.S. PATENT DOCUMENTS 6,216,544 B1 4/2001 Adachi et al.
8,204,693 B2 6/2012 Briers et al.
(Continued)

FOREIGN PATENT DOCUMENTS

CN 113341459 9/2021
CN 114371504 4/2022
(Continued)

OTHER PUBLICATIONS

Wikipedia ("Distributed acoustic sensing." Wikipedia, The Free Encyclopedia. Wikipedia, The Free Encyclopedia, Jul. 5, 2022.) (Year: 2022).*
(Continued)

*Primary Examiner* — Lisa M Caputo
*Assistant Examiner* — Christian T Bryant
(74) *Attorney, Agent, or Firm* — DeLizio, Peacock, Lewin & Guerra LLP

(57) ABSTRACT

Some implementations relate to a computer-implemented method for creating digital acoustic sensing (DAS) related training data for a learning machine. The method may include moving a first optimal microseismic event location to a first perturbed microseismic event location in each of a plurality of first images. The method also may include modifying first shear waves and first compressional waves in each of the first images based on one or more signal travel times between the first perturbed microseismic event location and a fiber optic cable to form a plurality of training images configured to train a learning machine.

20 Claims, 19 Drawing Sheets

(51) Int. Cl.
  *G01V 1/42* (2006.01)
  *G01V 1/50* (2006.01)
  *G06N 3/084* (2023.01)
  *G06N 20/00* (2019.01)
  *G06T 5/60* (2024.01)
  *G06T 7/00* (2017.01)

(52) U.S. Cl.
  CPC ..... *G06N 3/084* (2013.01); *G01V 2210/1234* (2013.01); *G01V 2210/1299* (2013.01); *G01V 2210/41* (2013.01); *G01V 2210/646* (2013.01); *G06N 20/00* (2019.01); *G06T 5/60* (2024.01); *G06T 7/00* (2013.01); *G06T 2207/20081* (2013.01)

(56) References Cited

U.S. PATENT DOCUMENTS

| | | |
|---|---|---|
| 2015/0377667 A1 | 12/2015 | Ahmad et al. |
| 2017/0275986 A1 | 9/2017 | Nunes et al. |
| 2018/0003032 A1 | 1/2018 | Donzier et al. |
| 2018/0073904 A1 | 3/2018 | Parolini et al. |
| 2018/0202264 A1* | 7/2018 | Sarduy ............... G06N 20/00 |
| 2018/0356275 A1 | 12/2018 | Zhao et al. |
| 2019/0219716 A1* | 7/2019 | O'Toole ............... G01V 1/288 |
| 2019/0242735 A1 | 8/2019 | Garoon et al. |
| 2019/0324166 A1* | 10/2019 | Lolla .................. G01V 1/42 |
| 2019/0338621 A1 | 11/2019 | Jin et al. |
| 2020/0025963 A1 | 1/2020 | Ghahfarokhi et al. |
| 2020/0278465 A1 | 9/2020 | Salman et al. |
| 2020/0309981 A1 | 10/2020 | Ang et al. |
| 2020/0319360 A1* | 10/2020 | Horne ................. G01V 1/284 |
| 2021/0010839 A1 | 1/2021 | Garoon et al. |
| 2021/0018655 A1 | 1/2021 | Sun et al. |
| 2021/0025740 A1 | 1/2021 | Quin et al. |
| 2021/0047916 A1 | 2/2021 | Thiruvenkatanathan et al. |
| 2021/0088476 A1 | 3/2021 | Abdelfattah et al. |
| 2021/0089905 A1 | 3/2021 | Olsen et al. |
| 2021/0123334 A1 | 4/2021 | Madasu et al. |
| 2021/0318457 A1 | 10/2021 | Zheng et al. |
| 2021/0381865 A1 | 12/2021 | Ellison |
| 2021/0382194 A1 | 12/2021 | Mukhtarov et al. |
| 2021/0389486 A1 | 12/2021 | Thiruvenkatanathan |
| 2022/0034220 A1 | 2/2022 | Madasu et al. |
| 2022/0065085 A1 | 3/2022 | Shetty et al. |
| 2023/0417136 A1 | 12/2023 | Gibson, Jr. |
| 2024/0102835 A1 | 3/2024 | Jaaskelainen et al. |
| 2024/0118118 A1 | 4/2024 | Drew et al. |

FOREIGN PATENT DOCUMENTS

| | | |
|---|---|---|
| EP | 1250513 | 4/2005 |
| EP | 3800323 | 4/2021 |
| GB | 2570260 | 4/2022 |
| WO | 2021133864 | 7/2021 |
| WO | 2023249663 | 12/2023 |
| WO | 2024019761 | 1/2024 |
| WO | 2024072454 | 4/2024 |
| WO | 2024076374 | 4/2024 |

OTHER PUBLICATIONS

Huot et al. (Detection and Characterization of Microseismic Events from FiberâOptic DAS Data Using Deep Learning. Seismological Research Letters 2022;; 93 (5): 2543â2553. doi: https://doi.org/10.1785/0220220037) (Year: 2022).*
Wamriew et al. (Deep Neural Networks for Detection and Location of Microseismic Events and Velocity Model Inversion from Microseismic Data Acquired by Distributed Acoustic Sensing Array. Sensors (Basel). Oct. 5, 2021;21(19):6627. doi: 10.3390/s21196627. PMID: 34640947; PMCID: PMC8512364.) (Year: 2021).*
"PCT Application No. PCT/US2022/077293, International Search Report and Written Opinion", Jun. 27, 2023, 17 pages.
Drew, et al., "Oil and Gas Well Multi-Phase Fluid Flow Monitoring With Multiple Transducers and Machine Learning", Pending U.S. Appl. No. 63/263,898, filed Nov. 11, 2021, 17 pages.
"PCT Application No. PCT/US2022/073172, International Search Report and Written Opinion", Mar. 23, 2023, 9 pages.
"PCT Application No. PCT/US2022/074086, International Search Report and Written Opinion", Apr. 13, 2023, 10 pages.
Anikiev, et al., "Microseismic event location using artificial neural networks", First International Meeting for Applied Geoscience & Energy Expanded Abstracts, Sep. 1, 2021, 5 pages.
Becker, et al., "Distributed Acoustic Sensing as a Distributed Hydraulic Sensor in Fractured Bedrock", Water Sources Ressearch, vol. 56, Issue 9, Aug. 14, 2020, 10 pages.
Carpenter, "Distributed Fiber-Optic Sensing Enhances Flow Diagnostics in Gas Condensate Well", Journal of Petroleum Technology, vol. 74, Issue 3, Mar. 1, 2022, 3 pages.
Castellanos, et al., "Microseismic Event Locations using the Double-Difference Algorithm", Recorder: Official Publication of the Canadian Society of Exploration Geophysicists, vol. 38 Issue No. 03, Mar. 1, 2013, 12 pages.
Dande, et al., "Fluid Flow Rate and Perforation Cluster Efficiency Using Fiber-Optics Das Data", 55th U.S. Rock Mechanics/Geomechanics Symposium Jun. 18-25, 2021, Jun. 18, 2021, 6 pages.
Ekechukwu, et al., "Well-Scale Demonstration of Distributed Pressure Sensing Using Fiber-Optic DAS and DTS", Scientific Reports vol. 11, Article No. 12505 (2021), Jun. 14, 2021, 18 pages.
Garcia-Ceballos, "Machine Learning Based Two-Phase Flow Monitoring Using DAS", Colorado School of Mines; 2021 Virtual Undergraduate Research Symposium; https://www.mines.edu/undergraduate-research/machine-learning-based-two-phase-flow-monitoring-using-das/, Apr. 19-23, 2021, 6 pages.
Sharma, et al., "Well-Scale Multiphase Flow Characterization and Validation Using Distributed Fiber-Optic Sensors for Gas Kick Monitoring", Optics Express vol. 28, Issue 26, Dec. 21, 2020, 15 pages.
"PCT Application No. PCT/US2022/077805, International Search Report and Written Opinion", Jul. 3, 2023, 9 pages.
"PCT/US2022/073172 International Preliminary Report on Patentability", Jan. 2, 2025, 6 pages.
"U.S. Appl. No. 17/849,301 Non-Final Office Action", Jan. 15, 2025, 28 pages.
"U.S. Appl. No. 17/961,291 Final Office Action", Dec. 4, 2024, 16 pages.
"U.S. Appl. No. 17/961,291 Non Final Office Action", Aug. 16, 2024, 17 pages.

* cited by examiner

MACHINE LEARNING GUIDED SUBSURFACE FORMATION MICROSEISMIC IMAGING

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, Halliburton Energy Service, Inc.

FIELD

Aspects of the inventive subject matter relate generally to the field of microseismic imaging and more particularly to the field of microseismic imaging of microseismic activity in a subsurface formation.

BACKGROUND

In the hydrocarbon production industry, there can be a need to identify and measure subsurface hydraulic fractures proximate to a borehole. Microseismic monitoring is often used to estimate the size and orientation of hydraulic fractures. Such monitoring to accurately locate and image microseismic events can be challenging in real-time scenarios where the data can have a low signal-to-noise ratio and where multiple hydraulic stimulations can be occurring simultaneously.

BRIEF DESCRIPTION OF THE DRAWINGS

Example aspects are illustrated by way of example and not limitation in the Figures of the accompanying drawings in which.

DESCRIPTION OF THE ASPECTS

Overview of Some Inventive Aspects

Figure 1:
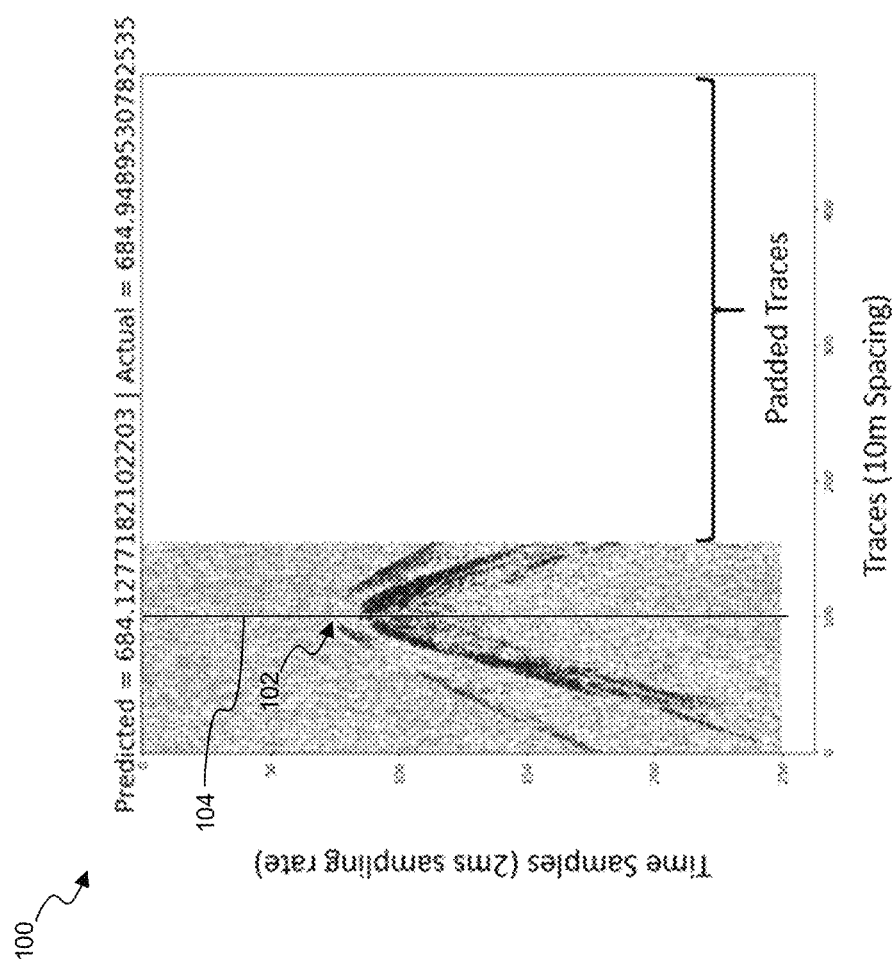
FIG. 1 is a graph depicting a microseismic event which has been detected by a DAS system.

Microseismic monitoring is often used to estimate the size and orientation of hydraulic fractures. Some techniques of microseismic monitoring involve distributed acoustic sensing (DAS) systems that utilize fiber optic cables to provide distributed strain sensing. In a DAS system, the optical fiber cable may act as the sensing element and measurements may made, and in part processed, using an attached optoelectronic device. Such a DAS system allows acoustic frequency strain signals to be detected over large distances and in harsh environments. DAS systems may collect DAS data including these acoustic frequency strain signals and other information.

Learning machines may process and provide insights about the DAS data. Learning machines may be implemented using any suitable combination of machine learning techniques, such as neural networks, supervised learning, statistics, etc. In some instances, before a learning machine is configured to process DAS data, the learning machine may be configured with a feature set and trained using training data.

Some aspects of the inventive subject matter relate to configuring feature sets and training data for a learning machine to process DAS data. In some implementations, a learning machine may be capable of processing DAS data to determine locations of subsurface microseismic events. The learning machine may be configured with a feature set related to the DAS data and trained using DAS-related training data. The training data may include training images created from DAS data. For example, each training image may initially include shear waves and compressional waves arising from a microseismic event at an optimal microseismic event location. Each training image may be modified to change the shear waves and compressional waves to appear as if they arose from a perturbed microseismic event location. The perturbed microseismic event location may be some distance away from the optimal microseismic event location. As a result, each training image may be modified to include shear waves and compressional waves relating to the perturbed microseismic event location. A learning machine may perform supervised learning using the training data including these training images.

After the supervised learning, the learning machine may be capable of receiving an input image indicating shear waves and compressional waves arising from a microseismic event at a given location. However, the given location may not be the optimal location at which the microseismic event occurred. The learning machine may be able to determine the optimal location based on the input image. Using the optimal location, the learning machine or other component(s) of the inventive subject matter may modify the shear waves and compressional waves of the input image to indicate the optimal location as the source of the microseismic event.

INTRODUCTION

With the decrease in disposable DAS crosswell strain and microseismic acquisition costs, there may be a desire to increase the quality of processing and to minimize the involvement of expert users during real-time operations of many concurrent hydraulic fracture stimulation projects. Traditional neural network based microseismic detection algorithms often trigger very low signal-to-noise events, which make traditional amplitude-semblance stack imaging techniques unreliable due to the presence of many localized optimal 3D locations. Simulfrac operations, where multiple wells are being completed at the same time, are challenging in that a stage-driven imaging approach may not be possible (e.g., because of difficulties related to initializing a potential starting location for imaging at a pumped stage location with multiple stages being pumped at once). Also, computational costs of searching for a global maximum semblance-stack location in a large three-dimensional (3D) volume of travel times may be too inefficient. Some implementations of the inventive subject matter may use machine learning guided microseismic imaging to perform, in real-time, a time-consuming process by which an expert user would otherwise perform in post-acquisition processing. However, some implementations of the inventive subject matter may perform new tasks related to microseismic imaging.

Microseismic Event Detection

As a precursor to the machine learning (ML) guided microseismic event backpropagation, multiple models may be utilized to find an initial microseismic event location sufficient for refinement (also referred to herein as an optimal microseismic event location). There may be geometrical consistency of DAS deployment in the lateral portion of an oil and gas well. Hence, the general shape of a microseismic event shot gather may be hyperbolic in nature. The broadness of the curvature in hyperbolic shape may be contingent upon an offset of the microseismic source from the fiber, where closer sources may have a sharper and more defined apex whereas further offset sources may have a broad and sweeping apex. Thus, a convolutional neural network may be trained to evaluate this curvature and estimate the perpendicular offset from the nearest apex channel along a plane. An object detection algorithm (e.g., the You Only Look Once algorithm) may be trained to search an image for the microseismic event apex which may be used conjunction with a predicted offset to produce an excellent initial location. This procedure may replace the traditional methods of using a large traveltime volume to search for an optimal non-linear amplitude-stack following the microseismic trigger detection.

FIG. 1 is a graph depicting a microseismic event detected by a DAS system. In some implementations, a learning machine may employ techniques described herein to determine an initial location for a microseismic event. In the graph 100, a line 104 indicates a predicted event apex. The curvature of the hyperbolic moveout may relatively broad and rounded. A prediction for the offset from DAS fiber is shown atop the graph 100 alongside the known offset. In some instances, an expert user may have located the event before the graph 100 was produced. With the microseismic event apex sensing point having a known (X,Y,Z) position, an offset prediction can be applied to this location and further ML guided imaging can commence. Hence, the event apex may be the initial position at which a correction process begins (additional details of an example correction process are described below). In some implementations, a learning machine performs object detection on a shot gather to identify the event apex (such as the event apex 102). Along with identifying the event apex, the object detection model also may classify whether the microseismic event is a "fiber pop" (i.e., an event occurring at or very near the DAS oil and gas well). Such "fiber pops" may be classified accordingly and used within a real-time automated velocity inversion process. This inversion process may supplant the workflow of an experienced analyst in post-acquisition processing.

Figure 2:
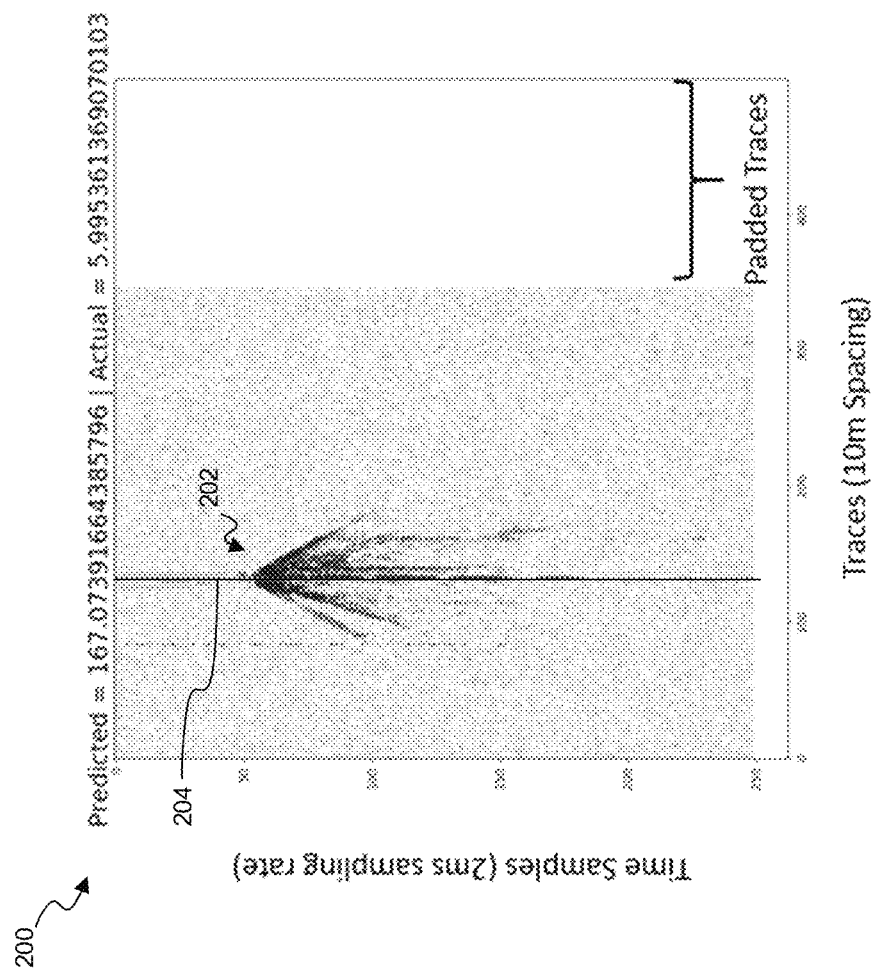
FIG. 2 is a graph depicting a "fiber pop".

FIG. 2 is a graph depicting a "fiber pop". As shown, a graph 200 includes a line 204 indicating a correct classification as a fiber pop and the predicted offset matching that of the known offset. In some implementations, a learning machine may employ object detection to identify the event apex 202 and produce the line 204. In the graph 200, the curvature of the hyperbolic moveout is relatively sharp. A learning machine may classify this microseismic event as a "fiber pop" and pass the graph 200 for further automated velocity inversion processing.

Feature Engineering

Figure 3:
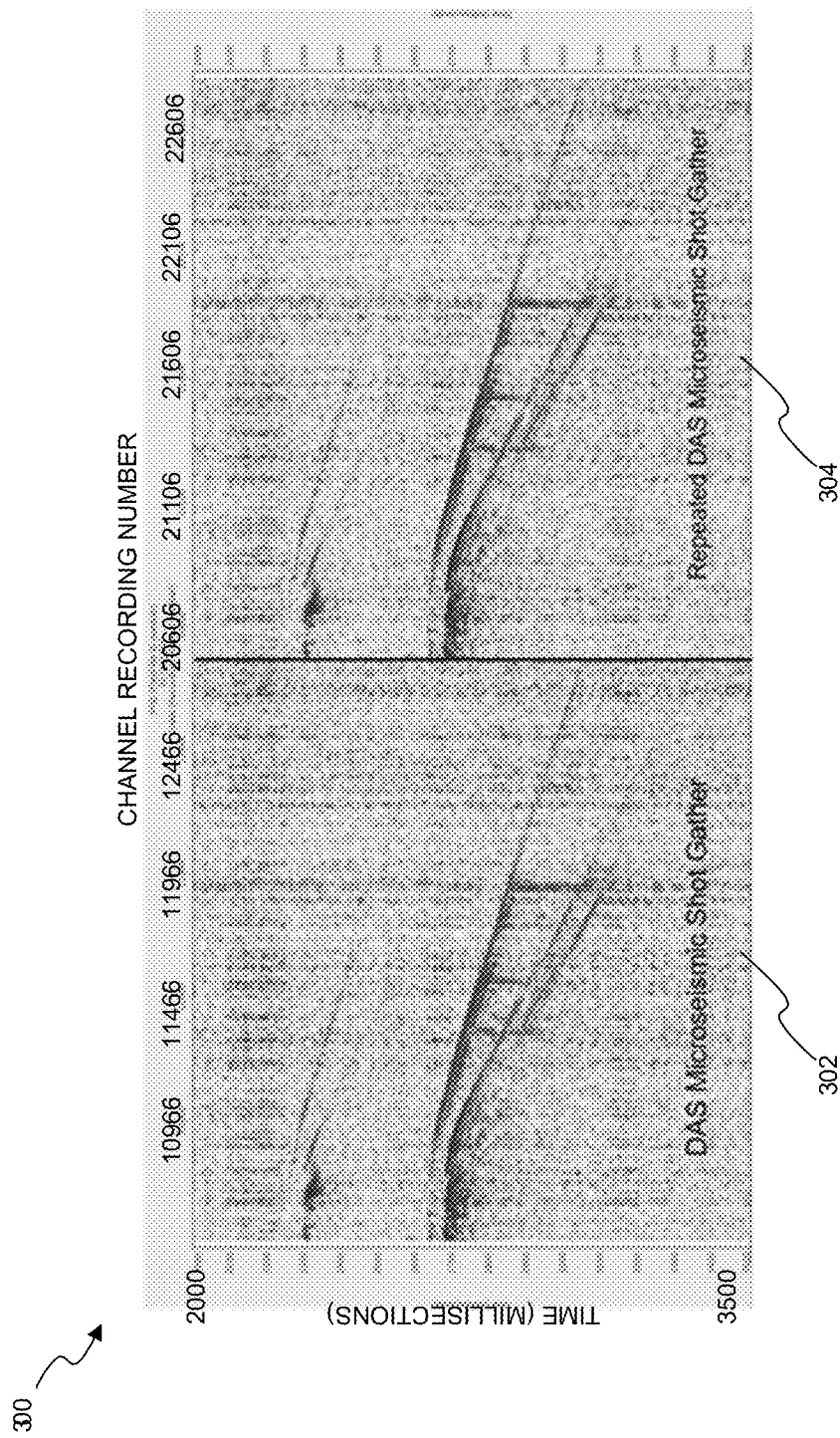
FIG. 3 is a graphical illustration of DAS data.

In some implementations of the ML guided microseismic imaging, time domain DAS data may be transformed in a physics-driven sense to best represent the expert user thought process. A microseismic event may be triggered and classified appropriately, such as with a bandpass filter, median filter, and automatic gain control applied to remove incoherent/coherent noise sources. The data may then be resampled to 2 ms with a 10 channel substack (1 m spatial sampling=10 m trace separation) to increase signal-to-noise, reduce dimensionality, and maintain a consistent aspect ratio for the machine learning algorithm. The resulting shot gather may then be repeated such that traveltime moveout corrections can be applied. FIG. 3 is a graphical illustration of DAS data. In FIG. 3, the DAS data 300 includes a left panel 302 and a right panel 304. The left panel 302 shows a triggered microseismic event with visible compressional and shear arrivals. The right panel 304 shows the same triggered microseismic event repeated.

Figure 4:
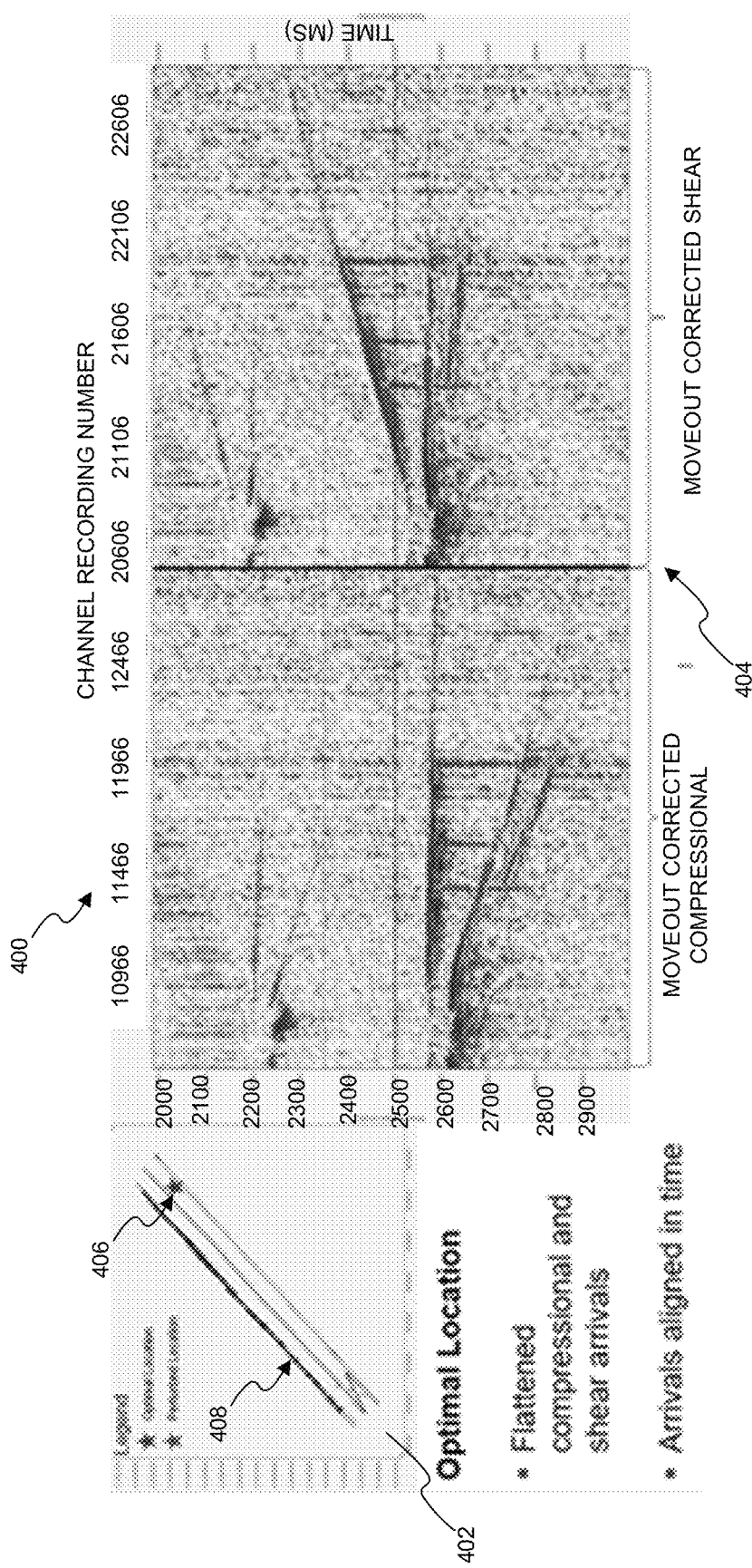
FIG. 4 is a graphical illustration of DAS data after flattening and time-alignment.

Microseismic imaging, with a stack-semblance algorithm, may be used to find the global maximum cost function position in 3D space for the microseismic event. From this position, an expert user or automated process may moveout correct the panels 302 and 304 using traveltimes from each DAS spatial sampling point for both the compressional and shear arrivals. Both arrivals may be flattened and aligned in time to be considered an optimal location of the microseismic event. FIG. 4 is a graphical illustration of DAS data after flattening and time-alignment. In FIG. 4, a map-view panel 402 shows a hydraulic fracture project with a star 406 indicating an XY position relative to the DAS array 408. That is, the star 406 indicates a position of the microseismic event. A shot gather panel 404 shows compressional and shear waves (from the shot gather panel 304 of FIG. 3) moveout corrected with traveltimes from source-receivers applied to flatten the gathers.

Figure 5:
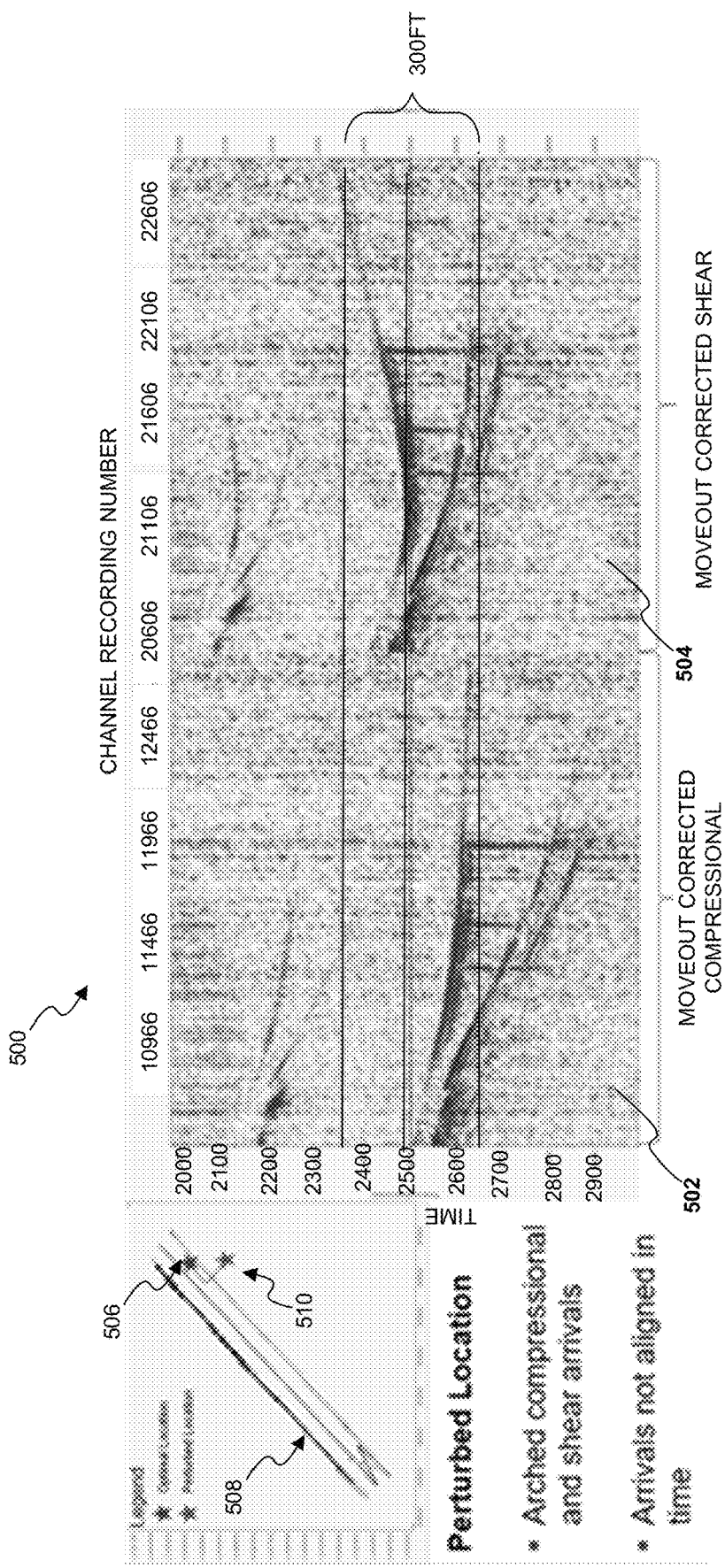
FIG. 5 is a graphical illustration of DAS data including a perturbed microseismic event location.

If a microseismic event is incorrectly located, the moveout corrections for both the compressional and shear panels may be skewed. Taking advantage of the inherent geometry of DAS acquisitions, a statistical model may predict the causes of the flatness and alignment of the compressional and shear panels. FIG. 5 is a graphical illustration of DAS data including a perturbed microseismic event location. In FIG. 5, an optimal microseismic event location 506 may be offset to a perturbed microseismic event location 510 on an XY plane 300 ft in both the direction along the fiber and the direction perpendicular to the fiber (also referred to as an offset distance). In some traditional situations, an expert user may interactively correct the perturbed microseismic event location 510 towards the optimal microseismic event location 506 to both flatten the compressional and shear arrivals and align them in time, which improves event location accuracy but is a very time-consuming process.

Machine Learning

Moveout corrected compressional and shear panels, with signal processing applied, may be the input features for a supervised machine learning technique. Multiple DAS projects worth of classified and expertly located events may comprise a training dataset. The moveout corrected confirmed microseismic events may be padded with whitespace to 500 channels and polarity may be removed from the data by taking an absolute value. Scaling may be applied to produce a mean value of 0 with a standard deviation of 1.

Figure 6:
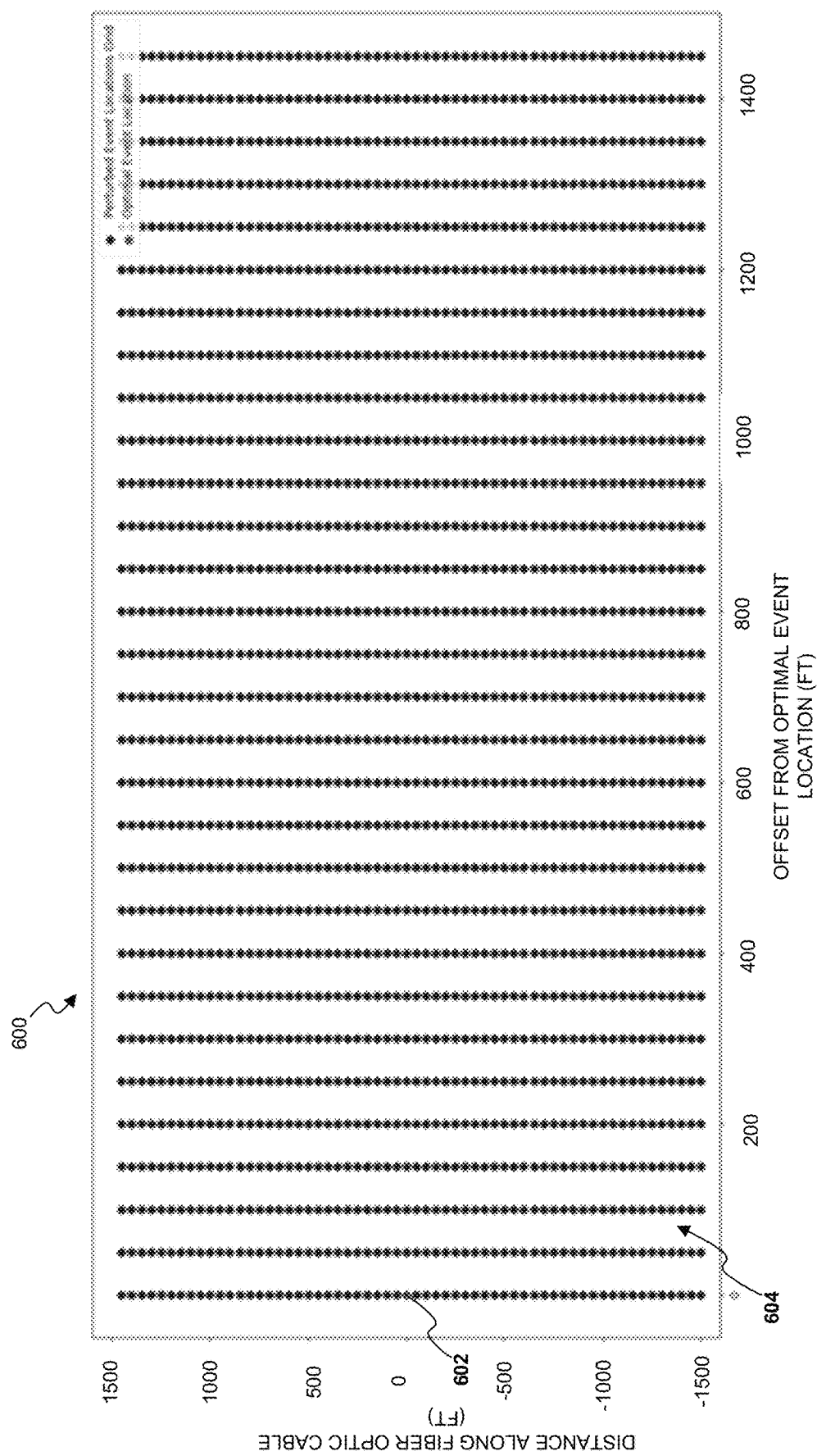
FIG. 6 shows a grid of perturbed microseismic event locations and an optimal microseismic event location.

To generate a training data set, a grid of simulated distances from an optimal microseismic event location may be developed in the two directions (offset distance from the fiber and the distance along the fiber). The optimal microseismic event location may be perturbed to a selected grid point, then the compressional and shear panels may be moveout corrected using the new source-spatial sampling points traveltimes. FIG. 6 shows a grid of perturbed microseismic event locations and an optimal microseismic event location. In the grid 600, there is a single optimal microseismic event location 602 and all other points represent perturbed microseismic event locations 604.

Figure 7:
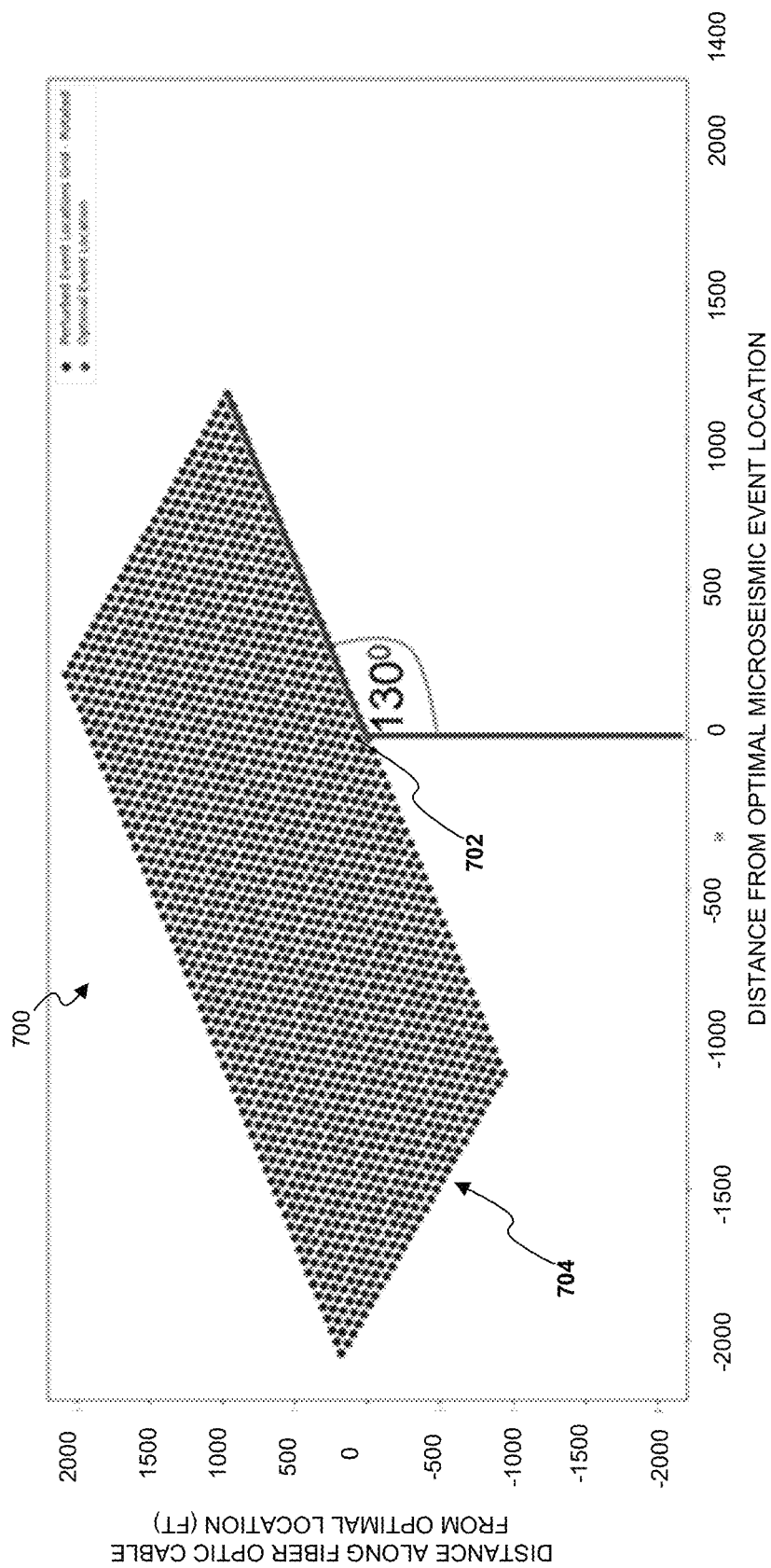
FIG. 7 shows a rotated grid of perturbed microseismic event locations and an optimal microseismic event location.

Although the geometry of unconventional oil and gas wells may generally have a consistent azimuth for the horizontal portion of the lateral, the azimuth may be in any direction from the wellhead position. Thus, a rotation matrix may be employed to rotate the perturbed distances along the fiber and offset distance along the well azimuth projection. FIG. 7 shows a rotated grid of perturbed microseismic event locations and an optimal microseismic event location. In FIG. 7, the rotated grid 700 includes perturbed microseismic event locations 704 and a single optical microseismic event location 702. The grid may be rotated 130 degrees or any suitable rotation amount (e.g., a different number of degrees).

With the training dataset built, the machine learning training/cross validation may be implemented. In some implementations, a learning machine includes a convolutional neutral network. By treating the moveout corrected compressional and shear panels as images, the learning machine may employ the convolutional neural network (CNN) for two-dimensional data (e.g., data samples in time and data samples in space). The CNN may solve for both offset distance from fiber and distance along the fiber simultaneously in a regression sense. The CNN may use an adaptive gradient descent algorithm used to update weights and biases. The cost function may be Mean Squared Error. In some implementations, the training dataset population may include 100,000 confirmed and expertly located microseismic events (e.g., 100,000 optimal microseismic event locations have been identified) and 15 k events withheld for cross validation.

Figure 8:
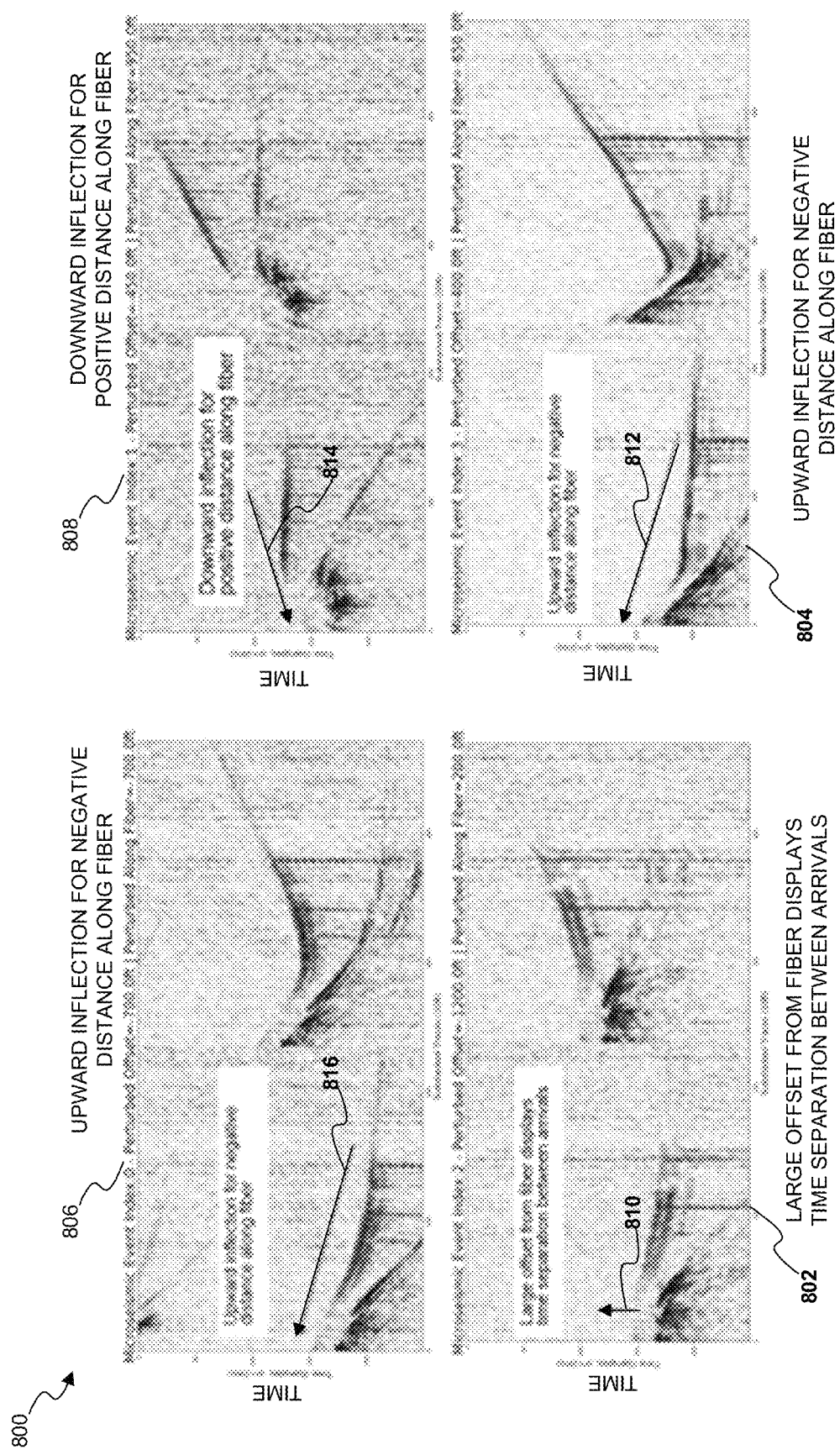
FIG. 8 illustrates shot gathers using example microseismic events which were perturbed using a grid.

FIG. 8 illustrates shot gathers using example microseismic events which were perturbed using a grid. FIG. 8 shows shot gathers 802, 804, 806, and 808. Note that inflections of a positive and negative nature are representative of a shift in distance along the fiber optic cable from the optimal location and the traveltime delta between compressional and shear panels may represent a shift in offset from the fiber.

In FIG. 8, the shot gather 802 may indicate a large offset from the fiber optic cable and display time separation between arrivals (see arrow 810). The shot gather 802 relates to a microseismic event index of 2, a perturbed offset of −1200 feet, and a distance perturbed on the fiberoptic cable of 200 feet. The shot gather 804 indicates upward inflection for negative distance along the fiber (see arrow 812). The shot gather 804 relates to a microseismic event index of 3, a perturbed offset 400 feet, and is perturbed along the fiberoptic cable −650 feet. The shot gather 806 indicates upward inflection for a negative distance along the fiberoptic cable (see arrow 816). The shot gather 806 relates to microseismic event index of zero, is perturbed offset of −700 feet, and is perturbed along the fiberoptic cable −700 feet. The shot gather 808 indicates a downward inflection for positive distance along the fiber optic cable (see arrow 814). The shot gather 808 relates to a microseismic event index of one, a perturbed offset of −450 feet, and a perturbation of 950 feet along the fiber optic cable.

Machine Learning Results

Figure 9:
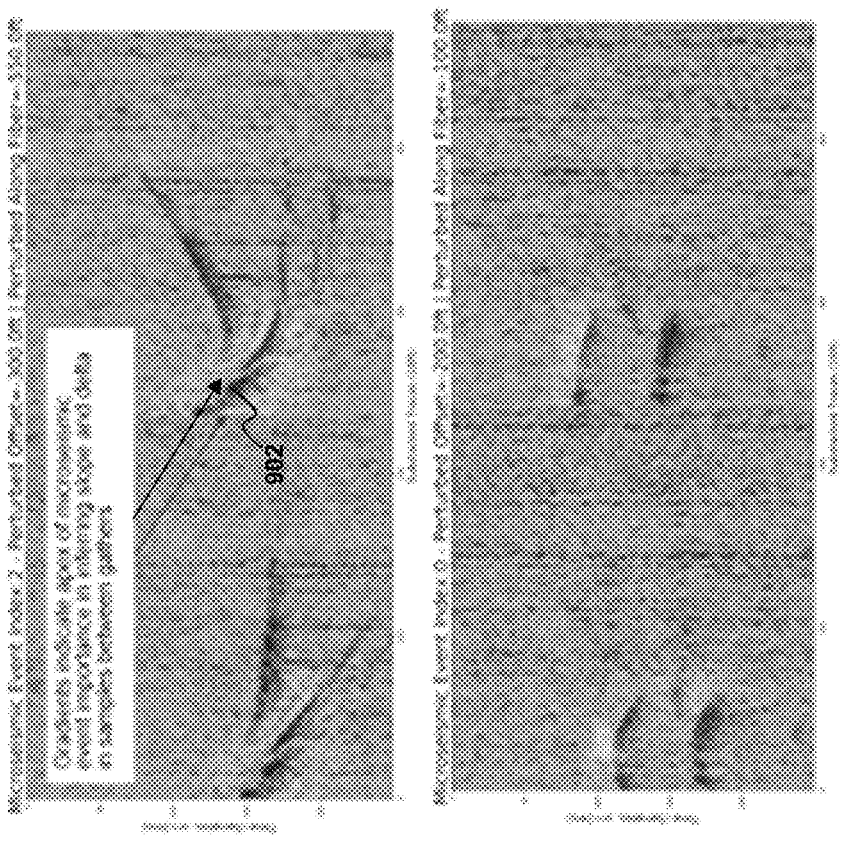
FIG. 9 shows perturbed microseismic event compressional and shear moveout panels each with a heat map overlay showing the final convolutional layer gradients.
Figure 9:
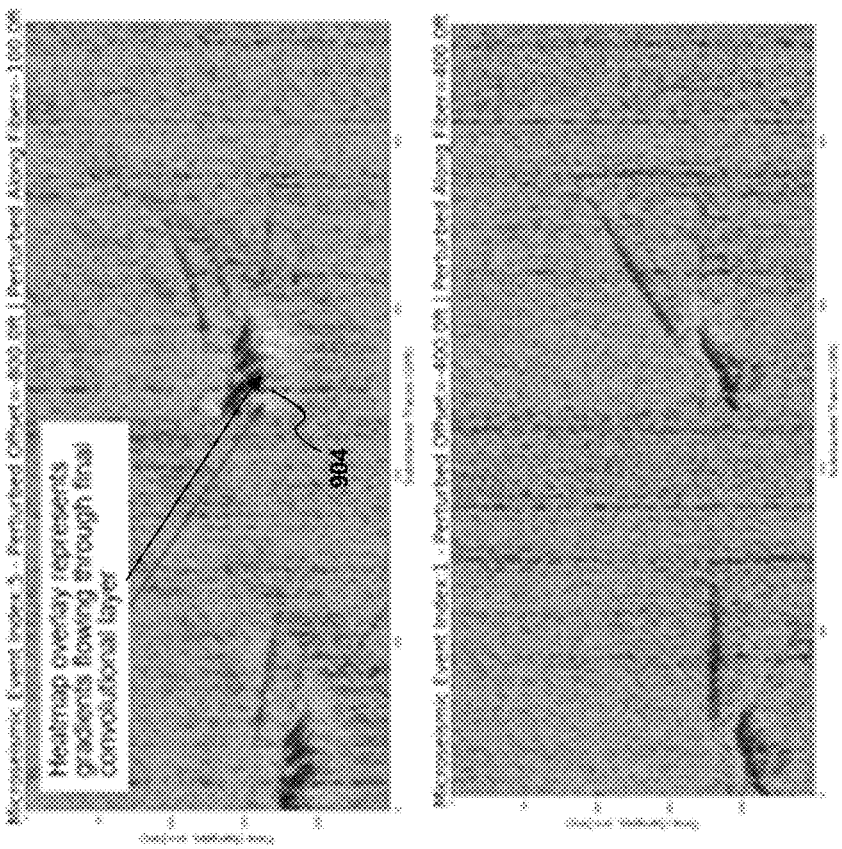

In some implementations, the convolutional neural network regression converged after several hundred iterations and may be capable of accurately predicting the correction required for both the microseismic event location along the fiber and offset distance. By investigating the gradients flowing through the final convolutional layer we can better understand the spatial features that some implementations of the convolutional neural network may be focusing on to make the distance along fiber and offset predictions. FIG. 9 shows perturbed microseismic event compressional and shear moveout panels each with a heat map overlay showing the final convolutional layer gradients. The hotspots (e.g., 902 and 904) demonstrate the CNN may focus on the curvature of the event apex, or nearest channels to the origination point of the microseismic event. In some implementations, all triggered microseismic events, regardless of signal-to-noise, will have this visible energy; thus, the technique may be effective regardless of the event position/SNR/focal mechanism.

Testing Project Results and Examples

Figure 10:
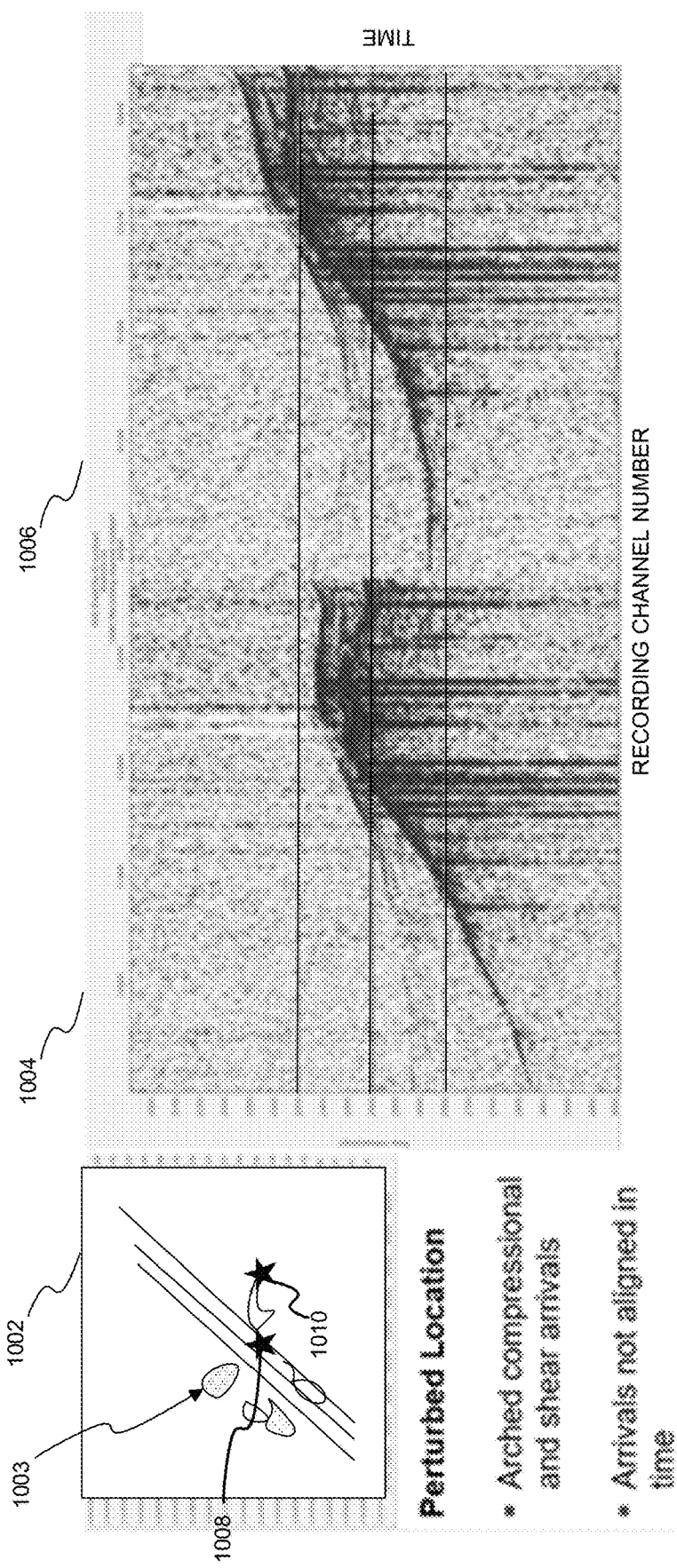
FIGS. 10, 11, and 12 show example results of machine learning guided image processing.
Figure 11:
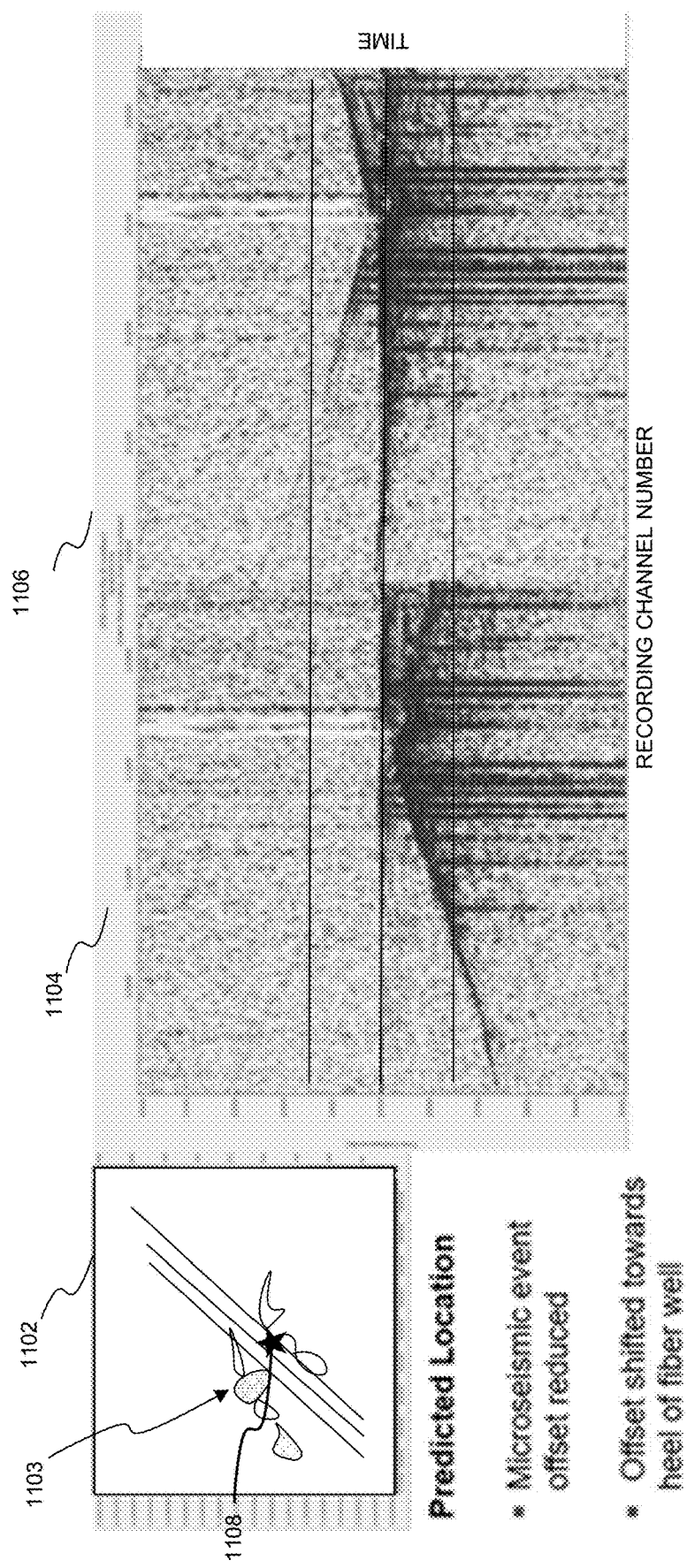
Figure 12:
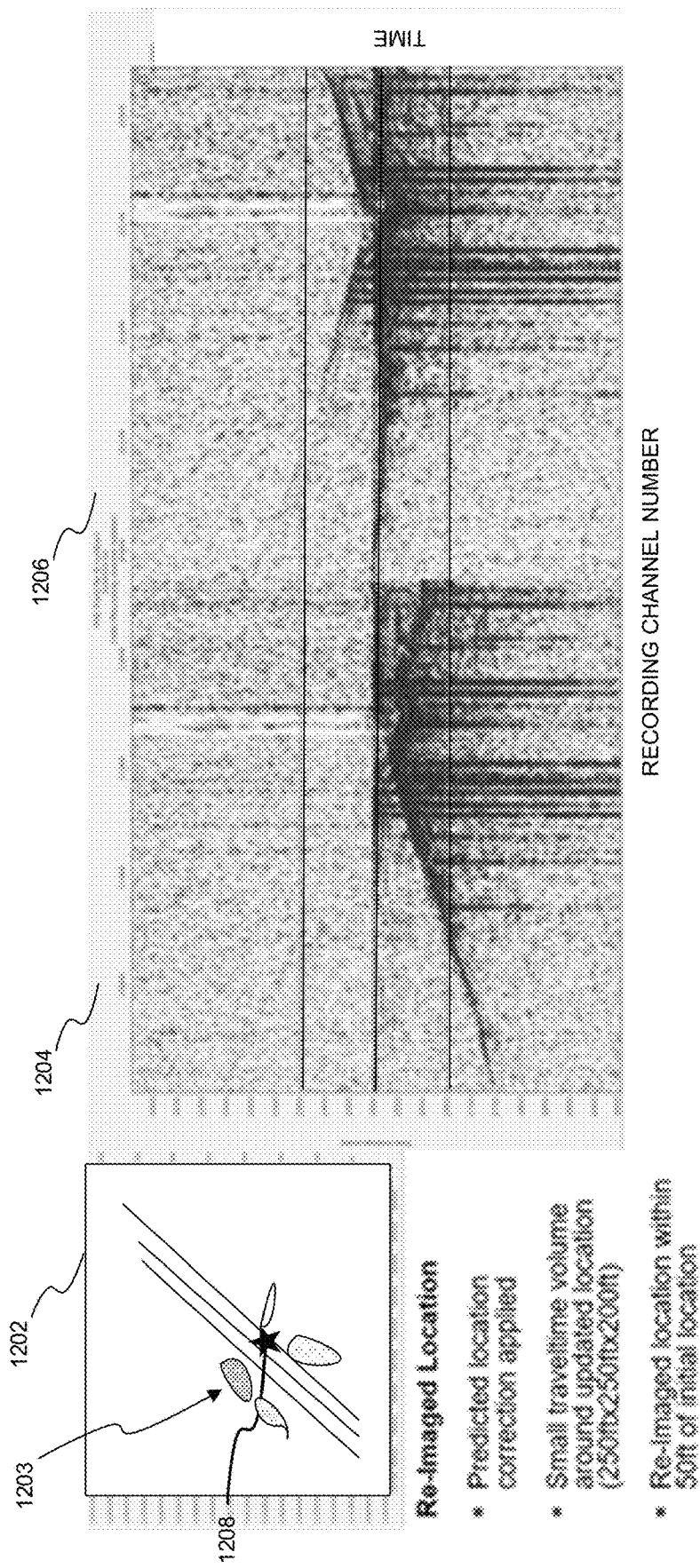

With the statistical model trained, some implementations of the learning machine may be tested on several projects with various acquisition companies, data types, and wellbore azimuths. FIGS. 10, 11, and 12 show the effectiveness of regression in backpropagating poorly located microseismic events to the global maximum stack-semblance, for some implementations of the inventive subject matter. FIG. 10 displays a map-view of an image space 1002 in which a perturbed microseismic event location appears as star 1008 where the moveout corrected compressional and shear panels are skewed and not aligned in time. The star 1010 is the optimal microseismic event location. The regions 1003 depict regions that one or more physics-based models (e.g., stack semblance models) have highlighted as possible optimal microseismic event locations. Incorrect hotspot positions in the image space 1002 may be a result of incorrect arrivals summing, an issue with common imaging. The moveout corrected compressional (1004) and shear panels (1006), arched arrivals and offset between panels show an incorrect location.

FIG. 11 displays an example of moveout corrected compressional panels at the corrected position in space based on the predictions from the trained learning machine (such as a learning machine including a CNN). The image space map view 1102 represents a well with the stack semblance hotspots 1103 marked, where an optimal microseismic event position is marked by a star 1108 and a ML predicted initial position directly beneath the star 1108. That is, the learning machine found an initial microseismic event location very close to the optimal microseismic event location. The initial microseismic location may coincide with a perturbed microseismic location on the grid 600 or the grid 700. The panels 1104 and 1106 show the moveout corrected compressional waves and shear waves (respectively) and flattened and aligned arrivals display a location close to optimal. Hence, some implementations may initially select a perturbed microseismic event location that is very close to the optimal microseismic event location.

Following the ML guided location, the learning machine may select a small volume around the new location to refine the position as is performed by an expert user in post-processing. FIG. 12 displays an example result of a small traveltime volume around the ML guided position and the flatness of the panels, as well as time alignment, indicate an optimal position in space. An example image space map view 1202 represents a well with the stack-semblance hotspots 1203 marked. The optimal microseismic event location is a star 1208 and the re-imaged event location post ML guiding is a second star underneath the star 1208 (the star 1208 and second star occupy the same or nearly the location in the map view 1202). The panels 1204 and 1206 show moveout corrected compressional and shear waves (respectively) and flattened and aligned arrivals display an optimal location with re-imaging and ML guiding (small shift in XY post ML prediction).

Figure 13:
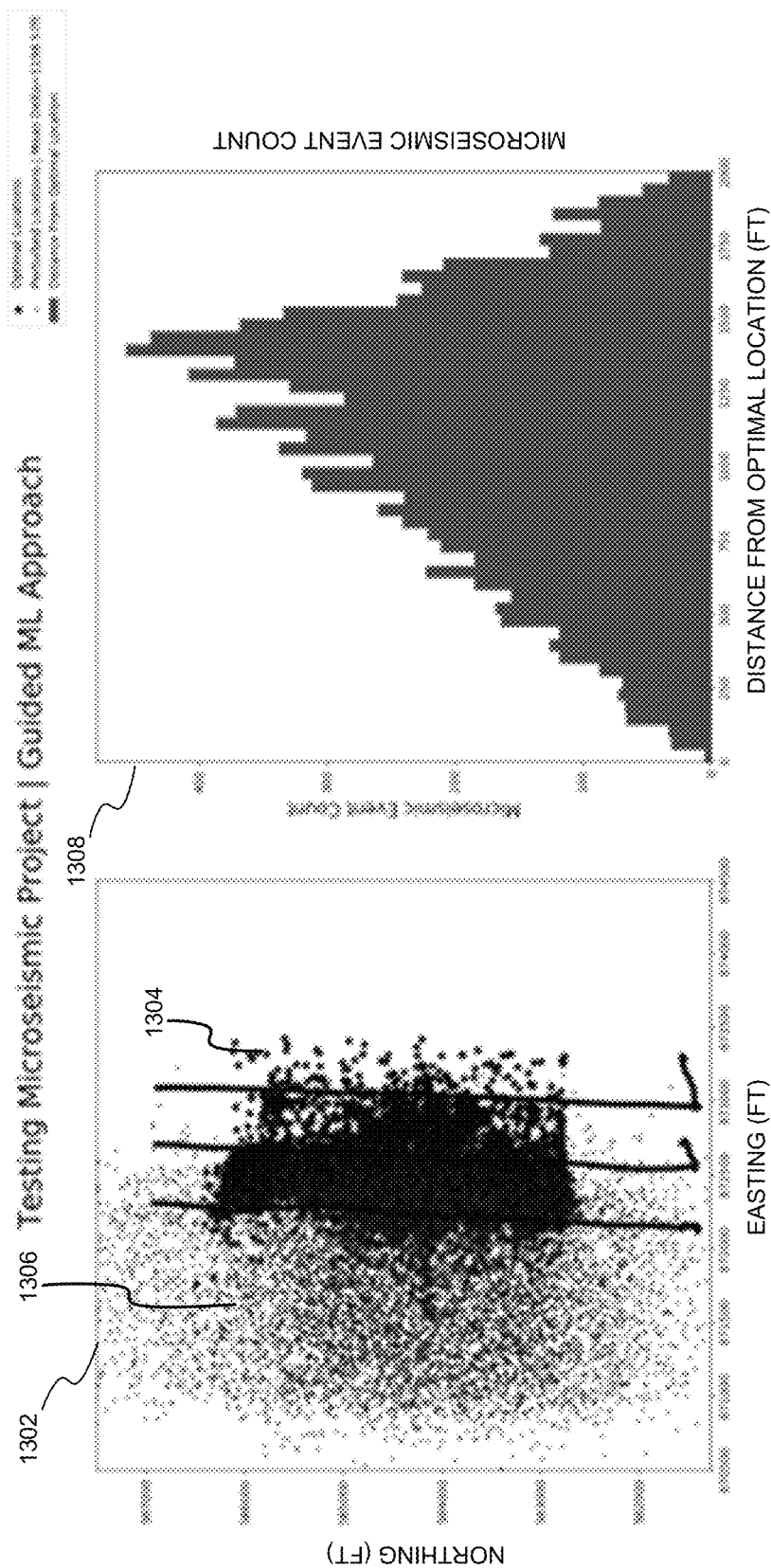
FIGS. 13, 14, and 15 display example test plots showing microseismic events and optimal microseismic event locations.
Figure 14:
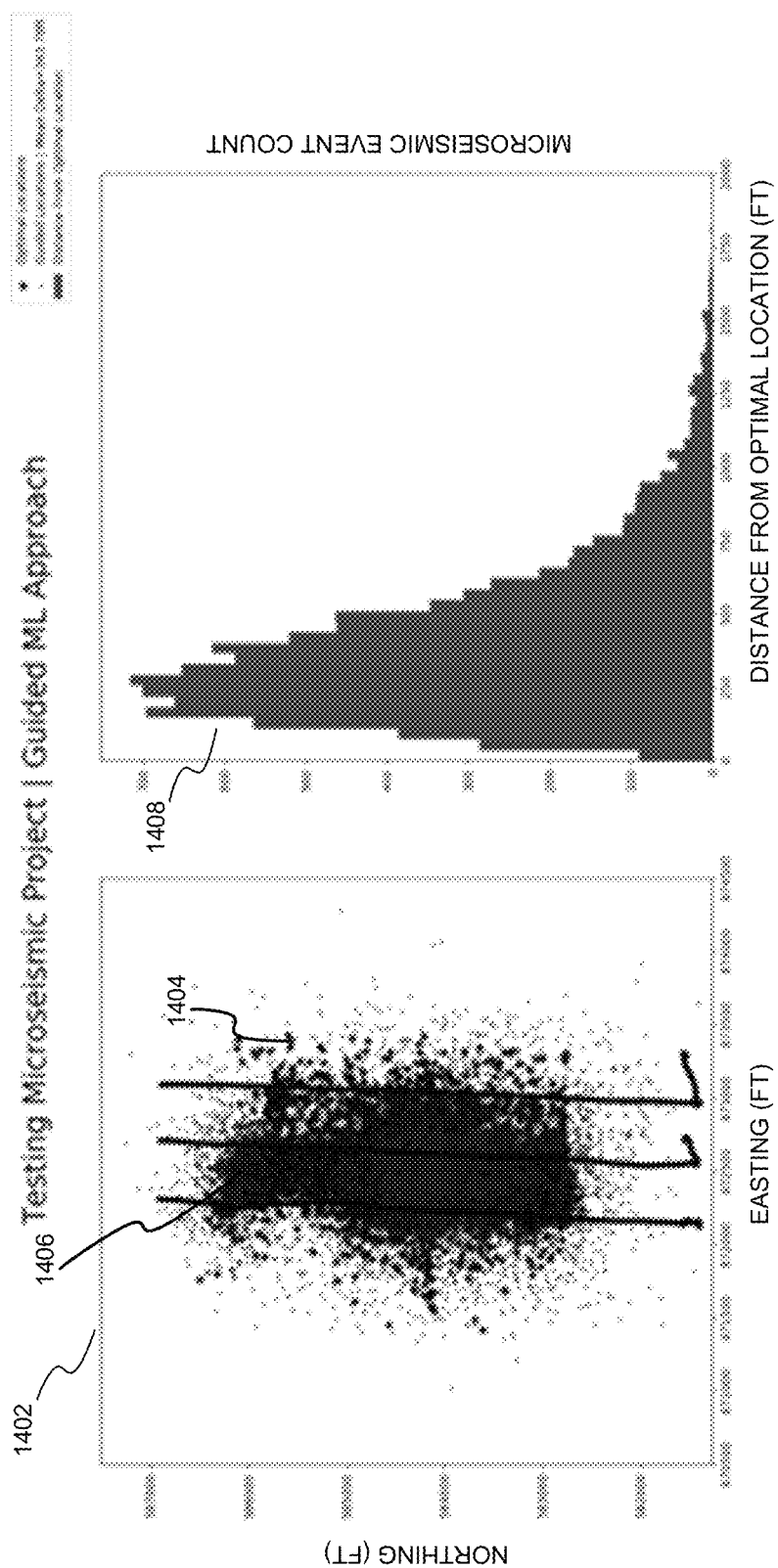
Figure 15:
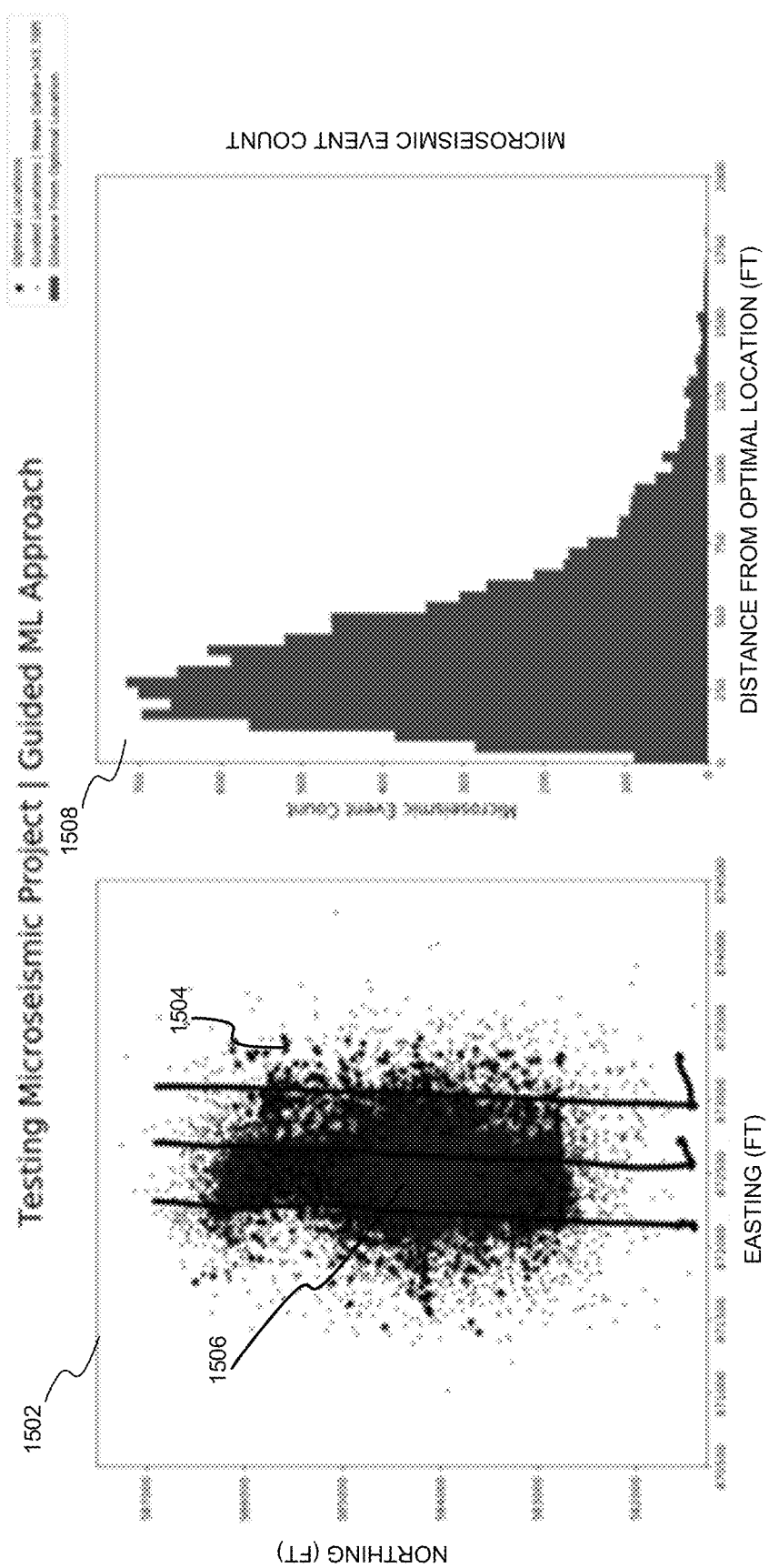

Re-processing of a test project may reveal insights about some implementations. The test project may be a Permian basin hydraulic fracture completion and include 20 k confirmed and expertly located optimal microseismic event locations, which took several weeks post acquisition. FIGS. 13, 14, and 15 each display two side by side plots: one being a map view of the post-processing results and the perturbed microseismic event locations and the second being a histogram of the distances from the optimal microseismic event locations. In FIG. 13, a map view 1302 shows optimal microseismic event locations as stars 1304 and perturbed microseismic event locations as dots 1306 near a well and fiber optic cable. The histogram 1308 shows distances between the optimal microseismic event locations and the perturbed microseismic event locations. The mean perturbation in the histogram 1308 represents an extremely poorly processed DAS microseismic project (mean of 1200 ft from optimal location), and this is done such that the full capabilities of the ML guided approach can be displayed. FIG. 14 shows the ML guided positions in space, which has reduced distances between the optimal microseismic event locations and the perturbed microseismic event locations. Perturbed microseismic event locations which show larger distances from the optimal microseismic event locations are off the heel portion of the DAS acquisition, where there may be a large traveltime ambiguity. Following a small volume re-imaging around the ML guided locations, FIG. 15 shows that a post processing quality result may be developed. FIG. 15 shows a map view 1502 including stars 1504 representing optimal microseismic event locations and dots 1506 representing perturbed microseismic event locations. FIG. 15 also includes a histogram 1508 showing distances between the perturbed microseismic event locations and the optimal microseismic event locations.

Figure 16:
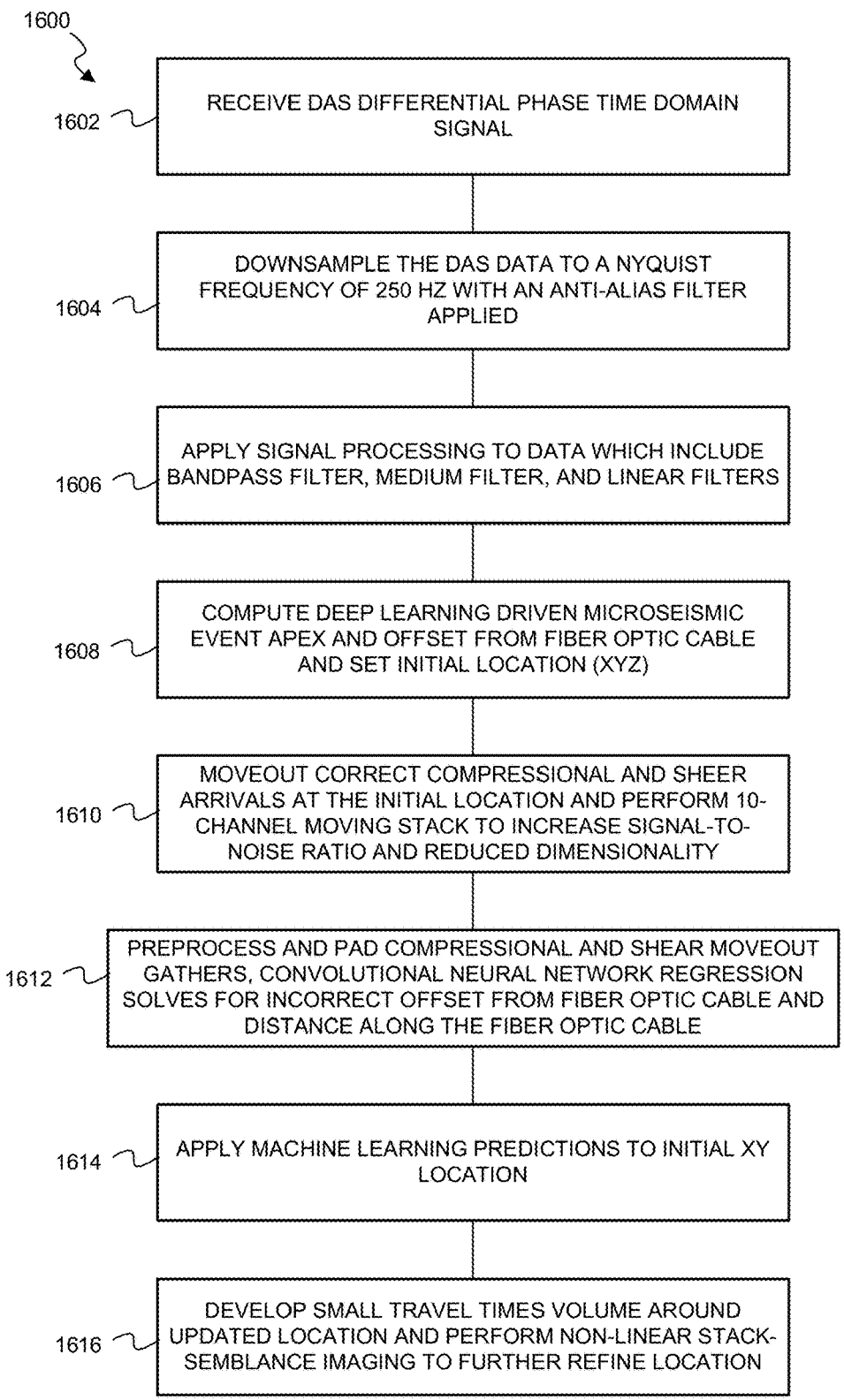
FIG. 16 is a flow diagram illustrating operations for machine learning guided distributed acoustic sensing microseismic imaging.

FIG. 16 is a flow diagram illustrating operations for machine learning guided distributed acoustic sensing microseismic imaging. In FIG. 16, a flow begins at block 1602. At block 1602, a learning machine receives DAS a differential phase time domain signal.

At block 1604, the system down samples the death data to a Nyquist frequency of 250 Hz with an anti-alias filter applied.

At block 1606, the system applies signal processing to the data, where the signal processing includes one or more bandpass filters, medium filters, and linear filters.

At block 1608, the system computes the wording driven microseismic event apex and offset from fiber optic cable and sets an initial location (e.g., a location represented in three-space.

At block 1610, the system moveout corrected compressional and shear arrivals at the initial location and performs a 10-channel moving stack to increase signal to noise ratio and reduce dimensionality.

At block 1612, the system preprocesses and pads compressional and shear moveout gathers and uses convolutional neural network regression to solve for incorrect offset from the fiber optic cable and distance along the fiberoptic cable.

At block 1614, the system applies machine learning predictions to the initial XY location.

At block 1616, the system develops a small travel times volume around the updated location and performs non-linear stack-semblance imaging to further refine the location.

Methods of Some Implementations

Figure 17:
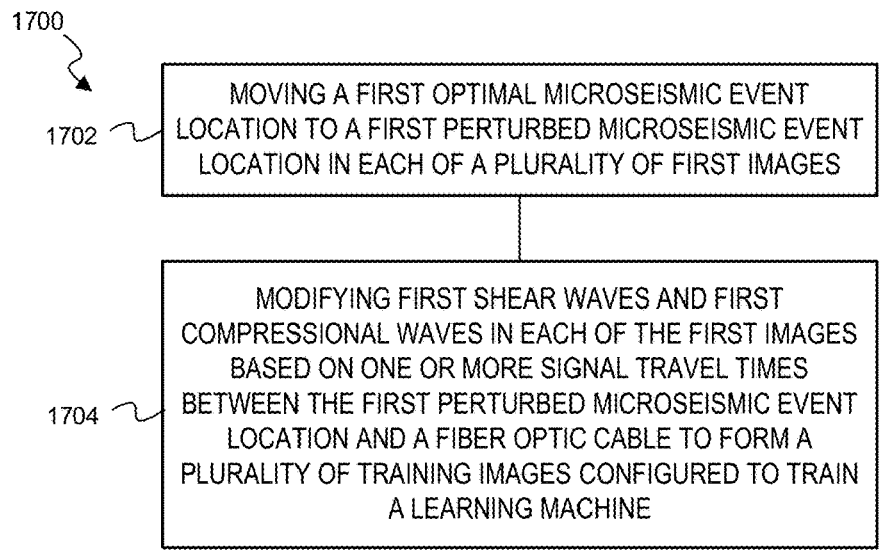
FIG. 17 is a flow diagram illustrating a method for training a learning machine.

FIG. 17 is a flow diagram illustrating a method for training a learning machine according to some aspects of the inventive subject matter. The flow diagram 1700 shows a method that includes building a first optimal microseismic event location to a first perturbed microseismic event location in each of a plurality of first images (block 1702). The method also may include modifying first shear waves and first compressional waves in each of the first images based on one or more signal travel times between the first perturbed microseismic event location and a fiber optic cable to form a plurality of training images configured to train a learning machine (block 1704).

Figure 18:
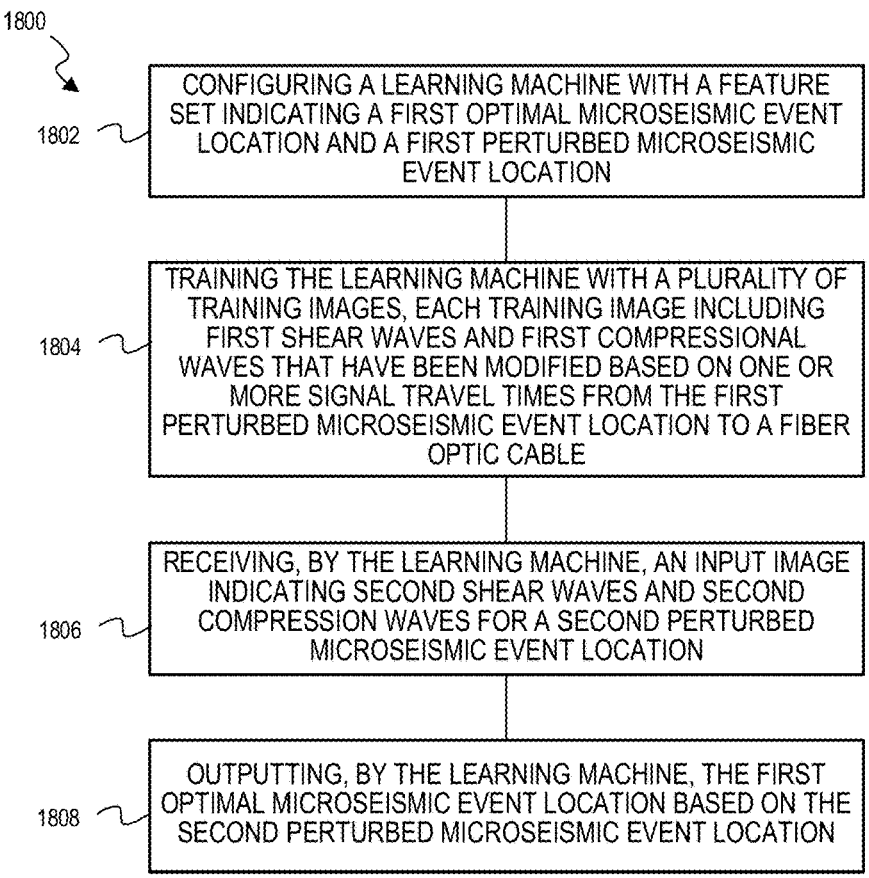
FIG. 18 is a flow diagram illustrating a method for controlling a learning machine to output and optimal microseismic event location.

FIG. 18 is a flow diagram illustrating a method for controlling a learning machine to output and optimal microseismic event location. The flow diagram 1800 shows a method that includes configuring a learning machine with a feature set indicating a first optimal microseismic event location and a first perturbed microseismic event location (1802). The method also may include training the learning machine with a plurality of training images, each training image including first shear waves and first compressional waves that have been modified based on one or more signal travel times from the first perturbed microseismic event location to a fiber optic cable (1804). The method also may include receiving, by the learning machine, an input image indicating second shear waves and second compressional waves for a second perturbed microseismic event location (1806). The method also may include outputting, by the learning machine, the first optimal microseismic event location based on the second perturbed microseismic event location (1808).

Computer System

Figure 19:
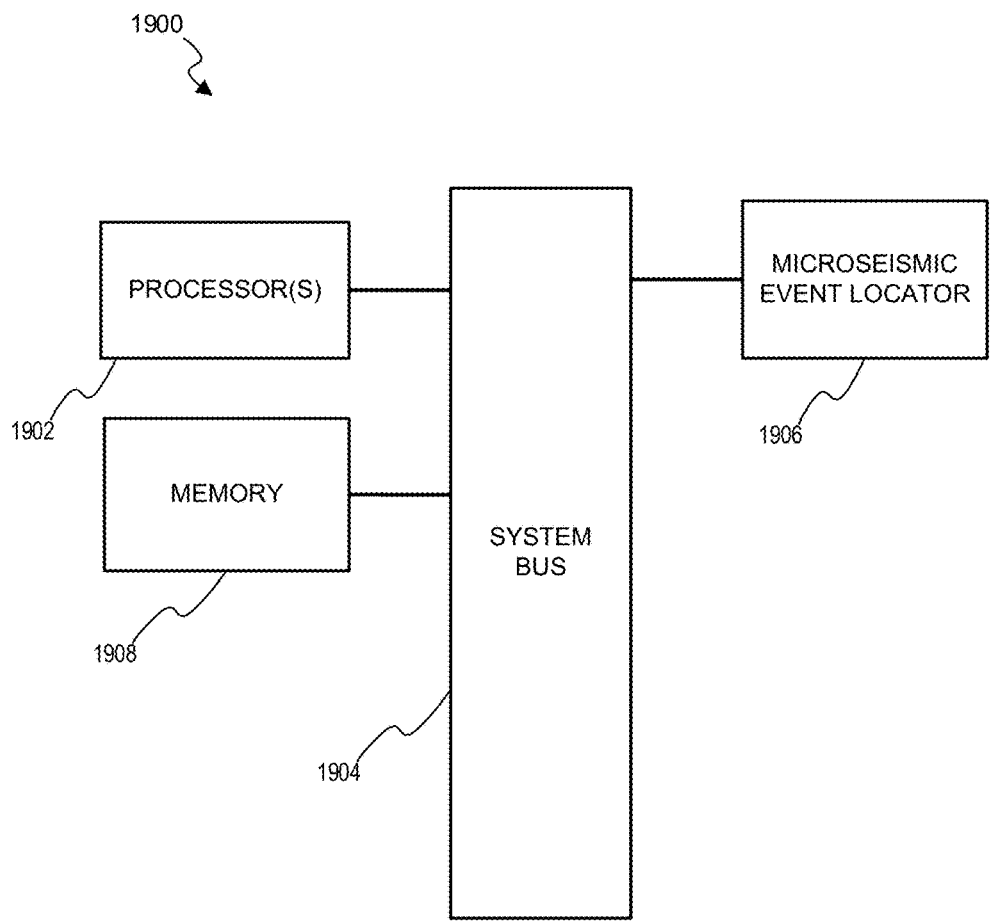
FIG. 19 is a block diagram illustrating a computer system, according to some aspects.

FIG. 19 is a block diagram illustrating a computer system, according to some aspects. In FIG. 19, a computer system 1900 may include one or more processors 1902 connected to a system bus 1904. The system bus 1904 may be connected to memory 1908. The memory 1908 may include any suitable memory random access memory (RAM), non-volatile memory (e.g., magnetic memory device), and/or any device for storing information and instructions executable by the processor(s) 1902.

In some aspects, the computer system 1900 can include additional peripheral devices. For example, in some aspects, the computer system 1900 can include multiple external multiple processors. In some aspects, any of the components can be integrated or subdivided.

The computer system 1900 also may include a microseismic event locator 1906. The microseismic event locator 1906 may implement the methods described herein. In some implementations, the microseismic event locator 1906 may include components that implement techniques of machine learning described herein. For example, the microseismic event locator 1906 may include program instructions that implement one or more CNNs and train the one or more CNNs using one or more of the training methods described herein. In some implementations, the computer system 1900 may be referred to as a learning machine that implements the inventive methods and techniques described herein. However, in some implementations, the learning machine may reside on a computer system like the computer system 1900. The learning machine may include the microseismic event locator 1906. Any component of the computer system 1900 can be implemented as hardware, firmware, and/or machine-readable media including computer-executable instructions for performing the operations described herein. For example, some implementations include one or more non-transitory machine-readable media including computer-executable instructions including program code configured to perform functionality described herein. Machine-readable media includes any mechanism that provides (e.g., stores and/or transmits) information in a form readable by a machine (e.g., a computer system). For example, tangible machine-readable media includes read only memory (ROM), random access memory (RAM), magnetic disk storage media, optical storage media, flash memory machines, etc. Machine-readable media also includes any media suitable for transmitting software over a network.

General Comments

FIGS. 1-19 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions stored on a computer storage media for execution by, or to control the operation of, a computing device.

If implemented in software, the functions may be stored on or transmitted over as one or more instructions or code on a computer-readable medium. The processes of a method or algorithm disclosed herein may be implemented in a processor-executable instructions which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures and indicate relative positions corresponding to the orientation of the Figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems can generally be integrated together in a single software product or packaged into multiple software products. Additionally, other implementations are within the scope of the following claims. In some cases, the actions recited in the claims can be performed in a different order and still achieve desirable results.

Example Aspects

Aspect #1: A computer-implemented method for creating training data for a learning machine, comprising: moving a first optimal microseismic event location to a first perturbed microseismic event location in each of a plurality of first images; and modifying first shear waves and first compressional waves in each of the first images based on one or more signal travel times between the first perturbed microseismic event location and a fiber optic cable to form a plurality of training images configured to train the learning machine.

Aspect #2: The method of Aspect #1, wherein before the modifying, the first shear waves and the first compressional waves were based on one or more signal travel times between the first optimal microseismic event location and the fiber optic cable.

Aspect #3: The method of any one of Aspects #1-2, wherein the first perturbed microseismic event location is a first distance away from the first optimal microseismic event location in a direction perpendicular to the fiber optic cable and a second distance away from the first optimal microseismic event location in a direction along the fiber optic cable.

Aspect #4: The method of any one of Aspects #1-3 further comprising: generating a point grid in which each point resides a different distance away from the first optimal microseismic event location in a direction perpendicular to the fiber optic cable and a different distance away from the first optimal microseismic event location in a direction along the fiber optic cable, wherein each point in the point grid corresponds to one or more signal travel times to the fiber optic cable, and wherein the first perturbed event microseismic location corresponds to a point in the point grid.

Aspect #5: The method of Aspect #4 further comprising: rotating the point grid in an azimuthal direction.

Aspect #6: The method of any one of Aspects #1-5 further comprising: training the learning machine with on the plurality of training images.

Aspect #7: The method of Aspect #6 further comprising: receiving, by the learning machine, an input image indicating second shear waves and second compressional waves for a second perturbed microseismic event location; and outputting, by the learning machine, a second optimal microseismic event location corresponding to the second perturbed microseismic event location.

Aspect #8: The method of Aspect #7 further comprising: modifying the second shear waves and second compressional waves in the input image based on one or more signal travel times between the second optimal microseismic event location and the fiber optic cable.

Aspect #9: A method comprising: configuring a learning machine with a feature set indicating a first optimal microseismic event location and a first perturbed microseismic event location; training the learning machine with a plurality of training images, each training image including first shear waves and first compressional waves that have been modified based on one or more signal travel times from the first perturbed microseismic event location to a fiber optic cable; receiving, by the learning machine, an input image indicating second shear waves and second compressional waves for a second perturbed microseismic event location; and outputting, by the learning machine, a second optimal microseismic event location based on the second perturbed microseismic event location.

Aspect #10: The method of Aspect #9 further comprising: modifying, based on the first optimal microseismic event location, the second shear waves and the second compressional waves in the input image based on one or more signal travel times between the second optimal microseismic event location and the fiber optic cable.

Aspect #11: The method of any one of Aspects #9-10, wherein the first optimal microseismic event location is separated from the second perturbed microseismic event location by a first offset perpendicular to the fiber optic cable and by a second offset running along the fiber optic cable.

Aspect #12: The method of any one of Aspects #9-11, wherein the first perturbed microseismic event location corresponds to a selected point in a point grid in which each point is a first distance away from the first optimal microseismic event location in a direction perpendicular to the fiber optic cable and a second distance away from the second perturbed microseismic event location in a direction along the fiber optic cable, and wherein each respective point on the point grid corresponds to one or more respective signal travel times between the respective point and the fiber optic cable.

Aspect #13: The method of Aspect #12, wherein the one or more respective signal travel times from the first perturbed microseismic event location and the fiber optic cable correspond to the one or more respective signal travel times of the respective point in the point grid.

Aspect #14: At least one non-transitory machine-readable medium including computer-executable instructions comprising: instructions to move a first optimal microseismic event location to a first perturbed microseismic event location in each of a plurality of first images; and instructions to modify first shear waves and first compressional waves in each of the first images based on one or more signal travel times between the first perturbed microseismic event location and a fiber optic cable to form a plurality of training images configured to train a learning machine.

Aspect #15: The at least one non-transitory machine-readable medium of Aspect #14, wherein before modification of the first shear waves and the first compressional waves, the first shear waves and the first compressional waves are based on one or more signal travel times between the first optimal microseismic event location and the fiber optic cable.

Aspect #16: The at least one non-transitory machine-readable medium of any one of Aspects #14-15, wherein the first perturbed microseismic event location is a first distance away from the first optimal microseismic event location in a direction perpendicular to the fiber optic cable and a second distance away from the first optimal microseismic event location in a direction along the fiber optic cable.

Aspect #17: The at least one non-transitory machine-readable medium of any one of Aspects #14-16, the instructions further comprising: instructions to generate a point grid in which each point resides a different first distance away from the first optimal microseismic event location in a direction perpendicular to the fiber optic cable and a different second distance away from the first optimal microseismic event location in a direction along the fiber optic cable, wherein each point in the point grid corresponds to one or more signal travel times to the fiber optic cable, and wherein the first perturbed microseismic event location corresponds to a point in the point grid.

Aspect #18: The at least one non-transitory machine-readable medium of Aspect #17, the instructions further comprising: instructions to rotate the point grid in an azimuthal direction.

Aspect #19: The at least one non-transitory machine-readable medium of any one of Aspects #14-18, the instructions further comprising: instructions to train the learning machine with on the plurality of training images.

Aspect #20: The at least one non-transitory machine-readable medium of Aspect #19, the instructions further comprising: instructions to receive, by the learning machine, an input image indicating second shear waves and second compressional waves for a second perturbed microseismic event location; and instructions to output, by the learning machine, a second optimal microseismic event location corresponding to the second perturbed microseismic event location.

The invention claimed is:

1. A computer-implemented method for creating training data and for training a learning machine in a computer system, comprising:
moving a first optimal microseismic event location in a subsurface formation to a first perturbed microseismic event location in each of a plurality of first images;
modifying first shear waves and first compressional waves to provide first modified shear waves and first modified compressional waves in each of the first images based on one or more signal travel times between the first perturbed microseismic event location and a fiber optic cable in the subsurface formation to form a plurality of training images configured to train the learning machine, wherein the first modified shear waves and the first modified compressional waves appear to have arisen from the first perturbed microseismic event location; and
training the learning machine with the plurality of training images to create a trained learning machine that can output a second optimal microseismic event location in the subsurface formation based on receiving a second image of a second perturbed microseismic event location, the second image comprising second shear waves and second compressional waves.

2. The method of claim 1, wherein before the modifying, the first shear waves and the first compressional waves were based on one or more signal travel times between the first optimal microseismic event location and the fiber optic cable.

3. The method of claim 1, wherein the first perturbed microseismic event location is a first distance away from the first optimal microseismic event location in a direction perpendicular to the fiber optic cable and a second distance away from the first optimal microseismic event location in a direction along the fiber optic cable.

4. The method of claim 1 further comprising:
generating a point grid in which each point resides a different distance away from the first optimal microseismic event location in a direction perpendicular to the fiber optic cable and a different distance away from the first optimal microseismic event location in a direction along the fiber optic cable, wherein each point in the point grid corresponds to one or more signal travel times to the fiber optic cable, and wherein the first perturbed microseismic event location corresponds to a point in the point grid.

5. The method of claim 4 further comprising:
rotating the point grid in an azimuthal direction.

6. The method of claim 1 further comprising:
training the learning machine comprising a convolutional neural network that uses regression to simultaneously solve for both offset distance from the fiber optic cable and distance along the fiber optic cable.

7. The method of claim 6 further comprising:
receiving, by the trained learning machine, an input image indicating second shear waves and second compressional waves for a second perturbed microseismic event location; and
outputting, by the trained learning machine, a second optimal microseismic event location corresponding to the second perturbed microseismic event location.

8. The method of claim 7 further comprising:
modifying the second shear waves and second compressional waves in the input image based on one or more signal travel times between the second optimal microseismic event location and the fiber optic cable.

9. A method for controlling a learning machine in a computer system, comprising:
configuring the learning machine with a feature set indicating a first optimal microseismic event location and a first perturbed microseismic event location in a subsurface formation;
training the learning machine with a plurality of training images, to provide a trained learning machine, each training image including first shear waves and first compressional waves that have been modified to provide first modified shear waves and first modified compressional waves based on one or more signal travel times from the first perturbed microseismic event location to a fiber optic cable in the subsurface formation, wherein the first modified shear waves and the first modified compressional waves appear to have arisen from the first perturbed microseismic event location;

receiving, by the trained learning machine, an input image indicating second shear waves and second compressional waves for a second perturbed microseismic event location in the subsurface formation; and outputting, by the trained learning machine, a second optimal microseismic event location in the subsurface location based on the second perturbed microseismic event location.

10. The method of claim 9 further comprising:

modifying, based on the first optimal microseismic event location, the second shear waves and the second compressional waves in the input image based on one or more signal travel times between the second optimal microseismic event location and the fiber optic cable.

11. The method of claim 9, wherein the first optimal microseismic event location is separated from the second perturbed microseismic event location by a first offset perpendicular to the fiber optic cable and by a second offset running along the fiber optic cable.

12. The method of claim 9, wherein the first perturbed microseismic event location corresponds to a selected point in a point grid in which each point is a first distance away from the first optimal microseismic event location in a direction perpendicular to the fiber optic cable and a second distance away from the second perturbed microseismic event location in a direction along the fiber optic cable, and wherein each respective point on the point grid corresponds to one or more respective signal travel times between the respective point and the fiber optic cable.

13. The method of claim 12, wherein the one or more respective signal travel times from the first perturbed microseismic event location and the fiber optic cable correspond to the one or more respective signal travel times of the respective point in the point grid.

14. At least one non-transitory machine-readable medium including computer-executable instructions to control a learning machine in a computer system comprising:

instructions to move a first optimal microseismic event location in a subsurface formation to a first perturbed microseismic event location in each of a plurality of first images;

instructions to modify first shear waves and first compressional waves to provide first modified shear waves and first modified compressional waves in each of the first images based on one or more signal travel times between the first perturbed microseismic event location and a fiber optic cable in the subsurface formation to form a plurality of training images configured to train a learning machine, wherein the first modified shear waves and the first modified compressional waves appear to have arisen from the first perturbed microseismic event location; and instructions to train the learning machine using the plurality of training images to create a trained learning machine that can output a second optimal microseismic event location in the subsurface formation based on receiving a second image of a second perturbed microseismic event location, the second image comprising second shear waves and second compressional waves.

15. The at least one non-transitory machine-readable medium of claim 14, wherein before modification of the first shear waves and the first compressional waves, the first shear waves and the first compressional waves are based on one or more signal travel times between the first optimal microseismic event location and the fiber optic cable.

16. The at least one non-transitory machine-readable medium of claim 14, wherein the first perturbed microseismic event location is a first distance away from the first optimal microseismic event location in a direction perpendicular to the fiber optic cable and a second distance away from the first optimal microseismic event location in a direction along the fiber optic cable.

17. The at least one non-transitory machine-readable medium of claim 14, the instructions further comprising:

instructions to generate a point grid in which each point resides a different first distance away from the first optimal microseismic event location in a direction perpendicular to the fiber optic cable and a different second distance away from the first optimal microseismic event location in a direction along the fiber optic cable, wherein each point in the point grid corresponds to one or more signal travel times to the fiber optic cable, and wherein the first perturbed microseismic event location corresponds to a point in the point grid.

18. The at least one non-transitory machine-readable medium of claim 17, the instructions further comprising:

instructions to rotate the point grid in an azimuthal direction.

19. The at least one non-transitory machine-readable medium of claim 14, the instructions further comprising:

instructions to train the learning machine comprising a convolutional neural network that uses regression to simultaneously solve for both offset distance from the fiber and distance along the fiber.

20. The at least one non-transitory machine-readable medium of claim 19, the instructions further comprising:

instructions to receive, by the trained learning machine, an input image indicating second shear waves and second compressional waves for a second perturbed microseismic event location; and instructions to output, by the trained learning machine, a second optimal microseismic event location corresponding to the second perturbed microseismic event location.

* * * * *